United States Patent

[11] 3,571,944

| [72] | Inventor | Victor Duhem |
| | | Fontainebleau, Avon, France |
| [21] | Appl. No. | 796,008 |
| [22] | Filed | Feb. 3, 1969 |
| [45] | Patented | Mar. 23, 1971 |
| [73] | Assignee | Venot-Pic |
| | | Franklin-Roosevelt-Avon, France |
| [32] | Priority | Feb. 28, 1968 |
| [33] | | France |
| [31] | | 141704 |

[54] ROTARY HEAT EXCHANGING APPARATUS
1 Claim, 3 Drawing Figs.

[52] U.S. Cl. ............................................. 34/57, 34/136, 34/226, 263/32
[51] Int. Cl. .................................................. F26b 17/10
[50] Field of Search .......................................... 263/32, 33; 34/135, 136, 57, 226

[56] References Cited
UNITED STATES PATENTS

| 1,078,125 | 11/1913 | Buttner | 34/136X |
| 1,988,677 | 1/1935 | Arnold | 34/136X |
| 2,076,873 | 4/1937 | Arnold | 34/136X |
| 3,102,794 | 9/1963 | Arnold | 34/136X |
| 3,430,936 | 3/1969 | Metzger | 263/33 |

FOREIGN PATENTS

| 605,662 | 7/1948 | Great Britain | 263/33 |

Primary Examiner—Albert W. Davis, Jr.
Attorney—Stevens, Davis, Miller and Mosher ABSTRACT: An apparatus for drying sugar beet pulps, fodder plants and similar products, composed of the juxtaposition of a central tube, a series of intermediate tubes of lesser diameter and a series of peripheral tubes of diameter equal to or greater than that of the central tube, through which the products to be dried and the hot gases circulate successively.

PATENTED MAR 23 1971 3,571,944

INVENTOR.
VICTOR DUHEM

ROTARY HEAT EXCHANGING APPARATUS

This invention relates to improvements in the apparatus disclosed in Applicant's copending prior application Ser. No. 625,685 of Mar. 24, 1967 now Pat. No. 3,447,792 whose disclosure is incorporated herein by reference.

Said prior application discloses a heat-exchange apparatus comprising a plurality of separate elongate tubelike members bundled together in the form of a unitary rotary drum and including a means for scooping respective amounts of an aggregate material into one end of the members whereupon said material is advanced along the length of the tubelike members and discharged from the opposite end thereof after having undergone a heat exchange therein.

The present invention, therefore, is directed to a particular embodiment of such an apparatus with juxtaposed enclosures, designed with a view to its application for drying sugar beet pulps, fodder plants such as alfalfa and all other similar products. It is fundamentally composed of the juxtaposition of a central tube, a series of intermediate tubes of lesser diameter and a series of peripheric tubes of diameter equal to or greater than that of the central tube, through which enclosures the products to be dried and the hot gases circulate successively without encountering any obstacles.

Known rotary dryers, applied to the drying of fodder plants, have two internal cylinders enabling the products to travel three times through the length of the apparatus. However, these apparatuses or drying enclosures, are not juxtaposed in a self-supporting bundle, and have to be equipped with supporting components and multiple drive elements, the internal enclosures presenting in addition obstacles in the form of the connecting arms of the various cylinders which hinder the satisfactory flow of the products.

The present invention remedies these disadvantages. The attached drawings give a nonlimiting example of the embodiment designed for this purpose:

Figure 1:
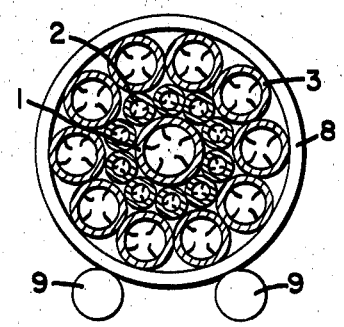
FIG. 1 is a sectional view taken along line B-B of FIG. 2, of an apparatus according to this invention.
Figure 2:
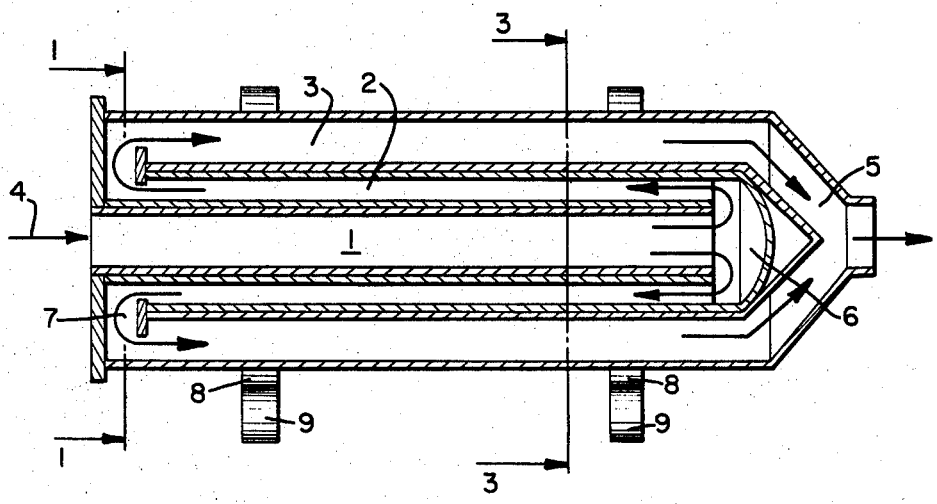
FIG. 2 is a longitudinal sectional view of the apparatus.
Figure 3:
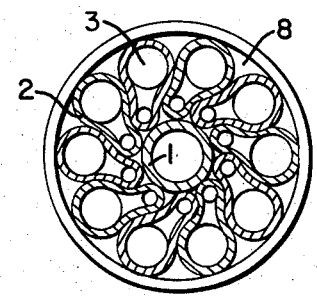
FIG. 3 is a sectional view taken along line A-A of FIG. 2.

The triple-pass multitubular rotary dryer, according to the invention, fundamentally composed of parallel tubes, receives the moist product to be dried from a cylindrical connecting shell between combustion chamber and dryer with an opening located at its top (not illustrated).

This cylindrical feed shell may be equipped with flow blades which facilitate the heat exchange and allow the product to trickle in the hot gas flow as it is conveyed.

After its initial passage through the central tube 1, the product is subdivised at the entry to the intermediate tubes 2 for the second passage, as indicated by the arrows. At the head of the dryer the products are led into the peripheral tubes 3 where they undergo final drying.

The exchanges are facilitated by a large surface of contact between product and gas, on the one hand, and between the product and the internal surface of the tubes, on the other hand, without any obstacle hindering or stopping the advance of the products. A notable advantage is that the division of the product into several compartimented circuits, after the first passage, neutralizes the expansion of an eventual ignition flash which would be limited in this case to a single circuit.

The original design of the apparatus ensures that it is balanced on its rotation axis both when running empty and when under load, the product being distributed over the whole cross section of the tubes.

At the discharge from the multitubular rotary dryer, the dried product is carried along by the hot gases, towards the subsequent treatment apparatuses: cyclones, grinders and conveyors.

The operation and construction of the apparatus are quite obvious from the foregoing; however, for purposes of illustration, it is noted that material is fed from externally of the bundle of conduits at 4 and into the central conduit 1, and discharges therefrom at the discharge end of conduit 1 into a chamber 6 which feeds into the inlet ends of the intermediate conduits 2. These, in turn, discharge at 7 into the inlet ends of peripheral conduits 3 whose opposite discharge ends lead into a discharge chamber 5 which lead to externally of the bundle.

The unitary bundle of conduits is rotatively supported upon two pairs of axially spaced rollers 9, one pair of which is driven from an external power source. Axially spaced apart circular members 8 are integral with the bundle of conduits and serve as bearing surfaces against which the rollers 9 act to support the bundle and to drive same through frictional contact between one member 8 and the driving pair of rollers 9.

While the conduits have been shown as being circular and reference has been made to their respective diameters, it is of course obvious that other than circular shapes could be used and that the mentioned diameters have reference to corresponding cross-sectional areas.

It is evident that the invention is not limited to the form of execution described and represented but includes all the alternative forms which derive from the same basic principle.

I claim:

1. A rotating heat exchanger comprising a plurality of elongate contiguous independent conduits each having an inlet and a discharge end, said conduits being fixed together to form a self-supporting bundle, means to rotate said bundle, said bundle comprising a central one of said conduits surrounded by an intermediate group of said conduits concentrically dispose about said central conduit, a peripheral group of said conduits disposed concentrically about said intermediate group of conduits, the cross-sectional area of each of the conduits of said intermediate group being less than that of said central conduit and the cross-sectional area of each of the conduits of said peripheral group being at least equal to that of said central conduit, said central conduit inlet end being arranged to receive a product from externally of said bundle and means connecting said central conduit discharge end into the respective inlet ends of the conduits of said intermediate group, means connecting the discharge ends of the conduits of said intermediate group into the inlet ends of the conduits of said peripheral group, and the discharge ends of the conduits of said peripheral group leading into a discharge chamber of said bundle, whereby a product fed into said central conduit successively passes through said central, intermediate and peripheral conduits thereby making three passes through the bundle, reversing directions twice, before entering said discharge chamber.